(12) United States Patent  (10) Patent No.: US 7,474,389 B2
Greenberg et al.  (45) Date of Patent: Jan. 6, 2009

(54) CARGO DIMENSIONAL AND WEIGHT ANALYZING SYSTEM

(76) Inventors: Dean Greenberg, 5755 Oberlin Dr., Suite 204, San Diego, CA (US) 92121; David Lilly, 6969 Kenamar Dr., Suite 101, San Diego, CA (US) 92121

( * ) Notice: Subject to any disclaimer, the term of this patent is extended or adjusted under 35 U.S.C. 154(b) by 0 days.

(21) Appl. No.: 11/641,476

(22) Filed: Dec. 19, 2006

(65) Prior Publication Data

US 2008/0143997 A1  Jun. 19, 2008

(51) Int. Cl.
*G01C 3/08* (2006.01)
(52) U.S. Cl. ...................................................... 356/5.1
(58) Field of Classification Search ....... 356/3.01–3.15, 356/4.01–4.1, 5.01–5.15, 6–22
See application file for complete search history.

(56) References Cited

U.S. PATENT DOCUMENTS 5,774,207 A * 6/1998 Yoshida et al. ............. 356/3.07
6,115,114 A * 9/2000 Berg et al. .................. 356/5.13

\* cited by examiner

*Primary Examiner*—Thomas H Tarcza
*Assistant Examiner*—Luke D Ratcliffe
(74) *Attorney, Agent, or Firm*—Michael E. Klicpera

(57) ABSTRACT

A laser scanner apparatus is disclosed herein for measuring the geometry and physical dimensions of one or more objects in a specified location or platform. The specified location or platform is within a range less than a predetermined maximum object distance. The laser scanner includes a waveform generator that generates a predetermined reference waveform to an analog laser that provides an modulated laser beam responsive to the reference waveform, an optical scanning system which 1) transmits and scans the object with the modulated laser light beam and 2) includes a means for receiving reflected the modulated laser light from the surface of an object on the platform or specified location, an avalanche photo-detector positioned to receive the processed modulated light from the optical processing system, and convert energy in the incident light into an amplitude-modulated range signal, a mixer is provided to down-convert the frequency of the range signal into a lower (LF) frequency. In practice, a first electrical circuit receives the down-converted range signal and converts it into a converted waveform that has a sinusoidal wave falling and rising that correspond to the zero crossings. The reference waveform is also applied to a mixer that down-converts it to the LF frequency. A second electrical circuit receives the down-converted reference waveform and converts it a second converted waveform that has a sinusoidal wave falling and rising that correspond to the zero crossings. A computer receives the first and second converted waveforms and outputs a highly accurate signal indicative of the time delay there between. The time delay is used by the computer system to determine the physical dimension of the particular scanning.

7 Claims, 6 Drawing Sheets

CARGO DIMENSIONAL AND WEIGHT ANALYZING SYSTEM

FIELD OF THE INVENTION

The present invention relates to a scanning laser system for accurately measuring one, two and three-dimensional parameters of objects with a specified position on a platform. More particularly, the present invention is designed to scan, with a novel laser system, freight and freight transporting systems for automating the determination of dimensional and weight data recorded for a particular shipment.

BACKGROUND OF THE INVENTION

Several techniques have been used to sense and measure the size, distance, geometry, spatial relationship and other parameters of remotely positioned objects. Such techniques include: 1) television sensors operating in the visible or near infrared parts of the electromagnetic spectrum: 2) imaging sensors utilizing CCD arrays: 3) acoustic ranging sensors; and 4) radar systems operating in a variety of different wavelengths. There have been attempts to use these techniques to address the need for accurate measurement of certain object parameters on a stationary or semi-continuous platform that is remotely positioned from the measuring system. One of the hallmarks of this methodology is the requirement for precise analysis of the size, shape and geometry of objects on the platform. Furthermore, in the semi-continuous platform situation or where multiple objects are positioned on a single platform, the spatial relationships between individual objects within the platform field will be required for accurate measurement and parametric assessments. Such measurement and assessments of data has been found useful for example, in manufacturing processes, metrology processes, materials handling, automated warehousing, quality control, security, robotic vision, and human vision surgery.

It has been known that due to the relative small wavelengths of lasers the potential exists to use laser technology to perform accurate measurements and detection. Several techniques for measuring distance with laser light signals are in common use today. They can be divided in two general categories, those that use the speed of light in some way to determine distance, and those that do not. The latter group usually uses a light projector located some distance from both the surface being lit and the detector. The detector then measures the direction of the light from both the surface being lit and the detector and triangulation is used to determine the surface's position. The accuracy of these systems depends on the separation distance between the emitter and detector, and typically works over a relatively narrow range of distances.

For two and three dimensional scanning, multiple axis laser systems generally employ a vertical scanning mirror orthogonally positioned with respect to the horizontal scanning mirror.

One laser system used the combination of the vertical scanning mirror and the horizontal scanning mirror, allowing the laser beam to scan an entire area with the intensity-modulated laser beam. Upon reflection from the object, the intensity modulation continued in the reflected beam and as a result, the reflected beam has the same type of intensity modulation as the probe beam, but with a different phase or time due to the additional distance each beam traveled. When the reflected beam returned, the light energy was converted to electrical energy by a photo-detector, and the phase of the intensity-modulated reflected beam was compared with the phase of the reference signal and a distance measurement obtained. However, the accuracy of the phase comparison method is limited by the ability of the phase detector used to resolve phase and the amount of isolation that can be obtained between the incoming and outgoing signals. Higher frequencies improve the resolution but worsen the crosstalk problem. The phase method of ranging has the additional problem that the range reading aliases at range intervals equal to half the wavelength of the modulation. For example, with 50 MHz modulation (6 meter wavelength), it is not possible to distinguish between actual distances of n, n+3, n+6, . . . meters, since all of them will result in the same detected phase difference. Multiple frequencies or some other technique must be used to resolve this ambiguity in many practical applications.

None of the above described systems are entirely satisfactory. It is therefore desirable to provide a laser distance measurement system in which the above described difficulties encountered by the above described systems are overcome.

SUMMARY OF THE INVENTION

A laser scanner is disclosed herein for measuring the geometry and physical dimensions of one or more objects in a specified location or platform. The specified location or platform is within a range less than a predetermined maximum object distance. The laser scanner includes a waveform generator that generates a predetermined reference waveform to an analog laser that provides an modulated laser beam responsive to the reference waveform, an optical scanning system which 1) transmits and scans the object with the modulated laser light beam and 2) includes a means for receiving the reflected modulated laser light from the surface of an object on the platform or specified location, an avalanche photo-detector positioned to receive the processed modulated light from the optical processing system, and convert energy in the incident light into an amplitude-modulated range signal, a mixer is provided to down-convert the frequency of the range signal into a lower frequency (LF). In practice, a first electrical circuit receives the down-converted range signal and converts it into a converted waveform that has a sinusoidal wave falling and rising that correspond to the zero crossings. The reference waveform is also applied to a mixer that down-converts it to the LF frequency. A second electrical circuit receives the down-converted reference waveform and converts it a second converted waveform that has a sinusoidal wave falling and rising that correspond to the zero crossings. A computer receives the first and second converted waveforms and outputs a highly accurate signal indicative of the time delay there between. The time delay is used by the computer system to determine the physical dimension of the particular scanning.

It is preferable that in operation a calibration target is situated within the platform or specified location. The calibration target has a plurality of steps with predefined distances between them, and is situated at a known distance from the optical components. During scanning, the time difference at the reflected surfaces of each scan is recorded. During subsequent processing of scanned object data, the stored information is used as a calibration to provide accurate range measurements.

After the calibration step, objects can be loaded on the platform or specific location and then the present invention is initiated to begin the laser scanning process which, after processing by a computer, provides the physical dimensions of the object. In addition, the platform or specific location may have the capability to weigh the object and this information is also processed by the computer.

DESCRIPTION OF THE PREFERRED EMBODIMENTS

The present invention is an apparatus and method for scanning the surface area of an object to provide third dimensional mapping data relating to the size, dimensions, geometry and spatial relationships of the object in the scanned area. The requirement for operator intervention using the present invention and method is minimal or may even be unnecessary.

Laser scan based measuring and recording apparatus of the type contemplated by the present invention are adapted to be such that laser light emitted from a laser light source is projected on a reflecting surface of a rotatably driven polygonal mirror. As the polygonal mirror revolves, the direction of the laser light reflected from the reflecting surfaces of the polygonal mirror is advanced so as to scan over the surface area of an object. Reflected light and associated data measurements are then redirected to the polygonal mirror and recoded by a photoreceptor. A specifically designed computer system then analyzes the data measurements to generate a visual, graphical or technical report on the object's physical dimensions and volumetric calculations.

Figure 1:
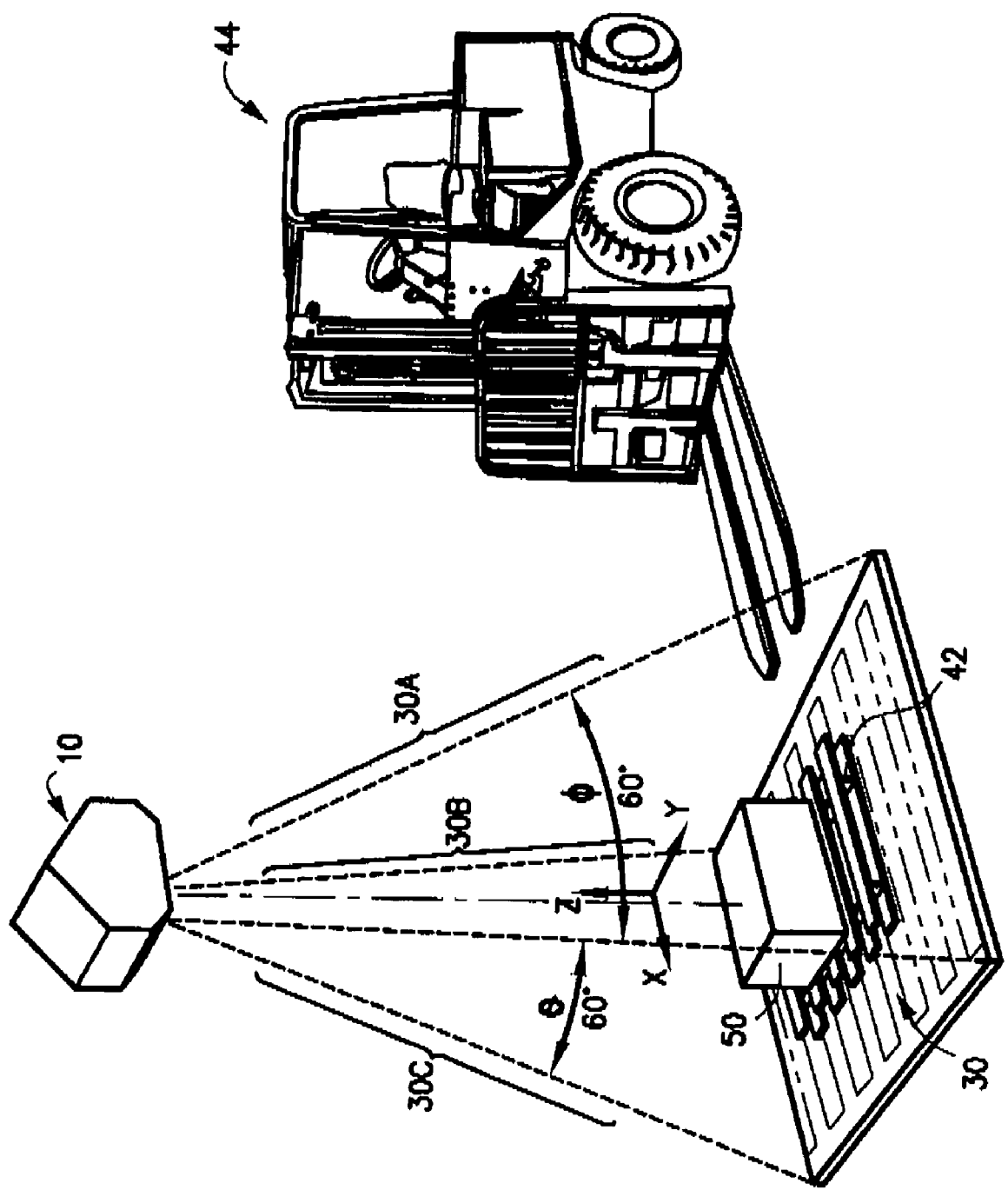
FIG. 1 is a conceptual diagram of the present invention using a single laser system to measure the dimensional properties of an object in its intended environment.

FIG. 1 is a conceptual diagram of the present invention using a single laser system to measure the dimensional weight properties of an object in its intended environment. For most uses, the present invention will be used to measure a single object within a defined area. It is also contemplated by the Applicant that the present invention could be used to measure multiple objects within the define area. Shown in this conceptual diagram is the object 50 positioned on a pallet 42 located on a platform 30. The object 50 on the pallet was positioned on the platform with the aid of a tractor or forklift 44. Located above the platform 30 is the present invention laser measuring apparatus 10 contained within a housing apparatus. The height of the laser scanning apparatus is approximately 8-15 feet above the object to be scanned. The laser measuring apparatus 10 is contained with a housing which accommodates the components analog laser, the mirror assemblies, the controlling motors and encoders, the rotating polygonal mirror, the avalanche photo detection device and various circuitry needed to provide electrical communication between the various components. The controlling computer and geometry detector signal processing apparatus can also be contained with the housing, or can be located remotely and communicating with the components in the housing using standard wiring technology or wireless technology. Also shown are a first laser light scan 30a on one of the periphery side, another laser light scan 30b of the surface of the object 50, and another laser light scan 30c on the other periphery side. The range of the scanning laser is 60 degrees in the "X" direction and 60 degrees in the "Y" direction. The figure also shows an X-Y-Z diagram indicating that present invention laser scanning apparatus is capable to measure the length (X), the width (Y) and the height (Z) of the object on a platform. In the simple example, the volume of a rectangular object is calculated by the formula "length X width X height" (where X refers to "multiplied by", three parameters that the present invention laser scanning apparatus obtains in the scanning operation. While only three scans are shown in this Figure, in actual practice the present invention laser measuring apparatus performs a series of scans in a pattern across the object to accurately measure the size, dimensions, geometry and spatial relationships (volumetric estimate) of the object in the scanned area. The Applicants anticipate that the present invention's scanning apparatus will be used in combination with a parcel transporting machine that improves shipping efficiency and accuracy. As shown in FIG. 1, the preferred transporting machine is a tractor or forklift 44 that can readily move pallets 42 carrying the objects 50. The present invention scanning apparatus for parcel objects is designed to conduct a volumetric estimate of the object. This allows the shipper to compare the actual weight and volumetric size with parcel documents to determine is any imprecision or mistake in the volumetric size in the parcel documents are incorrect and need to be revised.

Figure 2:
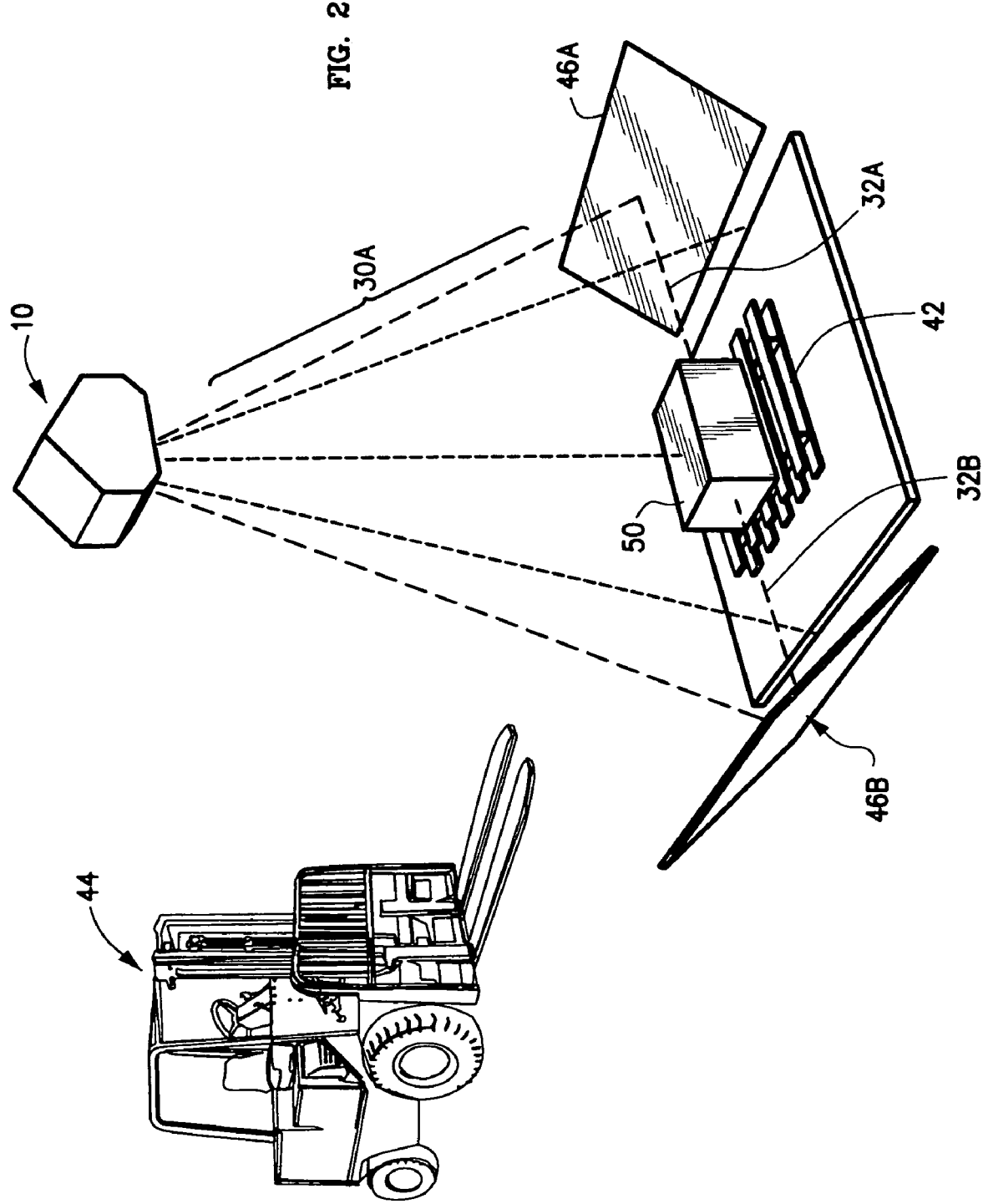
FIG. 2 is a conceptual diagram of the present invention using a single laser system and a plurality of mirrors to measure the dimensional properties of an object in its intended environment.

FIG. 2 is a conceptual diagram of the present invention using a single laser system 10 and a plurality of mirrors 46a and 46b to measure the dimensional properties of an object in its intended environment. Shown in this conceptual diagram is the object 50 positioned on a pallet 42 located on a platform 30. The object 50 on the pallet was positioned on the platform with the aid of a tractor 44. Located above the platform 30 is the present invention laser measuring apparatus 10 contained within a housing apparatus. The laser measuring apparatus 10 is contained with a housing which accommodates the components analog laser, the mirror assemblies, the controlling motors and encoders, the rotating polygonal mirror, the avalanche photo detection device and various circuitry needed to provide electrical communication between the various components. The controlling computer and geometry detector signal processing apparatus can also be contained with the housing, or can be located remotely and communicating with the components in the housing using standard wiring technology or wireless technology. Also shown are a first laser light scan 30a on one periphery side, another laser light 30b scanning the surface of the object 50, and another laser light scan 30c on the other periphery side. While only three scans are shown in the Figure, in actual practice the present invention laser measuring apparatus performs a series of scans across the object to accurately measure the size, dimensions, geometry and spatial relationships of the object in the scanned area.

Figure 3:
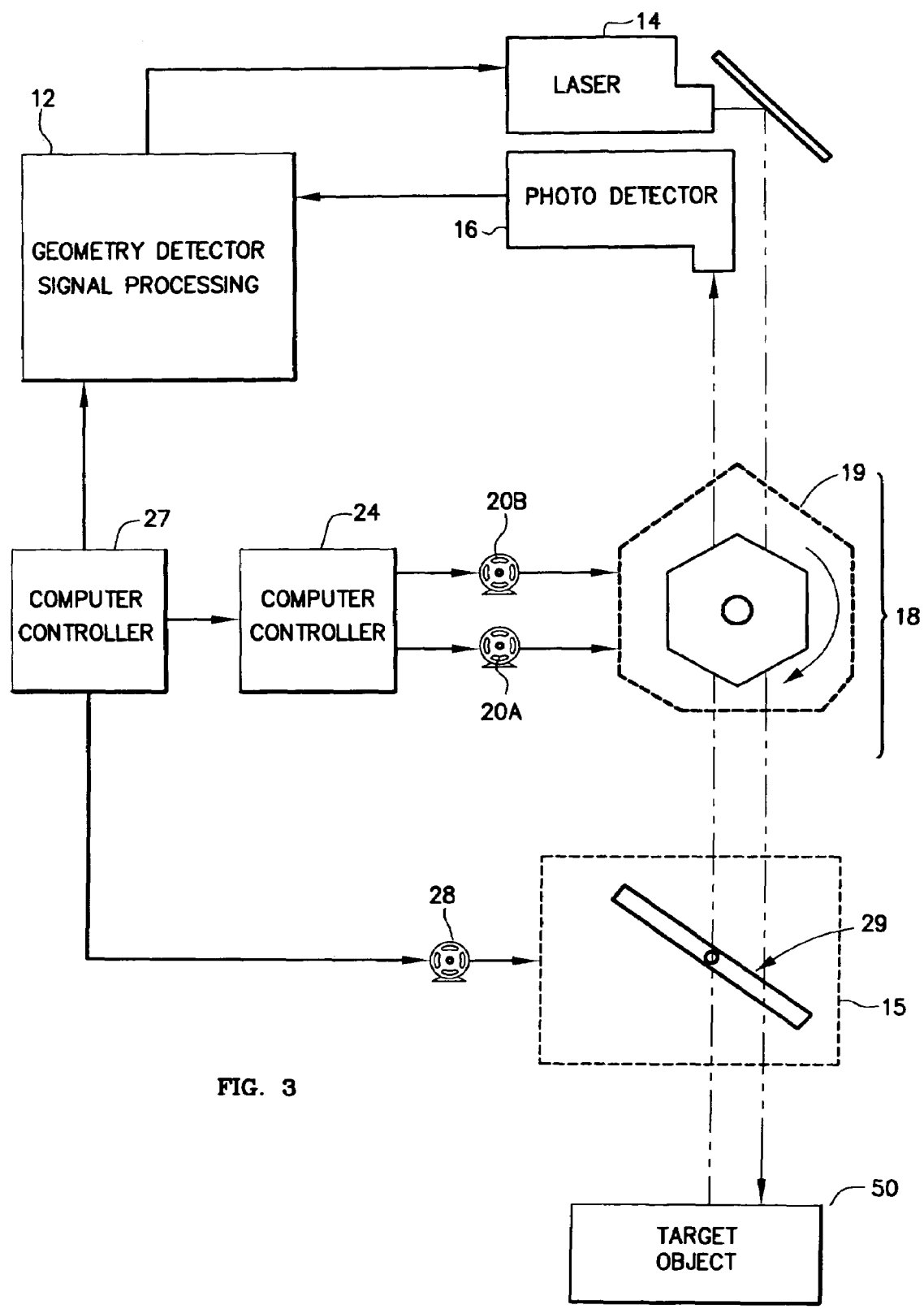
FIG. 3 shows the circuit configuration of the optical processing system including a analog modulated laser, a polygonal shaped reflector rotated by a motor which is controlled by a computer, an avalanche photo detection device, a plurality of computer controlled mirrors, and a geometry detector signal processing apparatus.

FIG. 3 shows the circuit configuration of the optical processing system including a analog modulated laser, a polygonal shaped reflector rotated by a motor which is controlled by a computer, an avalanche photo detection device, a plurality of computer controlled mirrors, and a geometry detector signal processing apparatus.

In general, the layout of a laser scan based measuring and recording apparatus includes a semiconductor laser 14 as a laser light source emits laser light. Solid state diode lasers are available operating in the visible or near infra-red (IR), with a range of output powers from 0.1-milliwatts to 12-watts. One example of a laser diode and laser power supply system that can be utilized with the present invention laser scanning measuring and recording apparatus 10 is one manufactured and marketed by Power Technology Inc. of Alexander, Ark. This laser is classified as a COTS laser diode module which has a beam diameter of approximately 5 mm with a maximum divergence is 0.91 milliradians (3 mm at the max range). The present invention laser scanning measuring and recording apparatus 10 can also work with 840 nm laser diodes. The transmitted wavelength is 780 nm (approximately 0.000078 mm) with 120 mW CW power and a signal frequency of 20000000 Hz. It is anticipated by the Applicants that the present invention laser scanning measuring and recording apparatus 10 can also work with 840 nm laser diodes. This lasers can be operated from a DC output to modulation frequencies of tens of GHz. Modulation of the laser beam is required when utilizing timing and phase comparison ranging techniques, and the analog laser diode 14 is a laser diode whose intensity can be modulated at high frequencies. Thus, responsive to the reference waveform, the laser diode supplies a modulated laser beam. In the present invention, the laser 14 is modulated with a reference signal using an accurate and stable wave form generator. The wave form generator is connected via a laser driver circuit and will modulate a signal in the range of 5-50 Mhz, and preferably from 20-30 Mhz to the laser diode. The preferred electrical signal of e.g. 20-30 Mhz is a chosen because a lower modulated signal would result in roll-over and duplication in phase detection which will not allow a one to one mapping and a higher modulated signal would result in a lose of resolution.

The laser beam modulated by the wave form generator is applied to a collimator lens that impedes the laser light diverging from the beam emitted from a laser diode thus providing a focused laser beam. A second optional parallel beam lens can be disposed in the optical path of the laser light to further shape the laser beam. The resulting laser beam output from the collimator and optional parallel lens is now applied to the shaped laser beam is projected to a rotating polygonal mirror 18. The polygonal mirror 18 is formed as an equilateral polygonal prism. Its lateral sides, which are six in the apparatus under consideration, are each provided with a reflector mirror. The six-sided scanning mirror 14 is an improvement over conventional two-sided or four-sided scanning mirrors disclosed in the prior art. This six-sided mirror 14 provides a robust optical system that has an ability to withstand industrial environments without substantially affecting optical alignment. Preferably, the polygonal scanning mirrors 14 is a diamond-turned metallic surface with protected gold surface mirror designed to provide greater than 99% reflectivity at the laser wavelength of interest. The polygonal mirror 18 is driven to rotate clockwise (as indicated by the arrow) rapidly about the central axis. The rotational force is provided by a computer controlled electric motor which might have a gear box or other arrangement to control the rotational speed. Another mirror 29 is provided in the laser light optical path and also controlled by the controlling computer. The controlling computer couples the two mirrors thus providing the means to scan horizontally and vertically. Optical encoders are provided for the polygonal mirror 17 and for the secondary mirror 29 to observe the relative position of each mirror in respect to each other and provides an output indicative of its position to the controlling computer 24. As the polygonal mirror 17 is rotated at, for example in a range of 2000-3000 RPM with a preferred range of 2400-2600 RPM. The accuracy and precision of the rotational speed is control by circuit of brushless DC motors and encoders 20a that are in electrical communication with a computer controller 24. The brushless DC motor provides the rotational energy. The encoder employs optical means to monitor the rotational speed parameters. A computer is used to receive the encoder information and then control the voltage or current to the rotational speed brushless DC motor to achieve a precise, accurate and stable RPM. One brushless DC motor that can be utilized with the present invention is that manufactured by Lincoln Laser located in Phoenix, Ariz. A type of encoder that can be utilized with the present invention is the Renco encoder manufactured and marketed by Lincoln Laser of Phoenix, Ariz. The polygonal mirror 17 provides vertical scanning and the secondary mirror 29 provides the horizontal scanning of the targeted objects 50. As illustrated in FIG. 3 (and provided in more detail in FIG. 4) the optical system includes the original modulation outgoing laser beam (not numbered in FIG. 3) and the reflected light is reflected off the target object 50 through the of the secondary mirror 29, the polygonal mirror 17, and to the optical processing system and photo detector 16 which will be subsequently described in more detail, for example with reference to FIG. 4.

The laser light is continuously projected to and scanned over the surface area of a target object 50 within a prescribed range. Also show as separate components in FIG. 3 are the computer and associated circuits and motors 20a and 20b. The use of brushless DC motors and the Renco encoders allow for precise movement and control of the mirrors.

Figure 4:
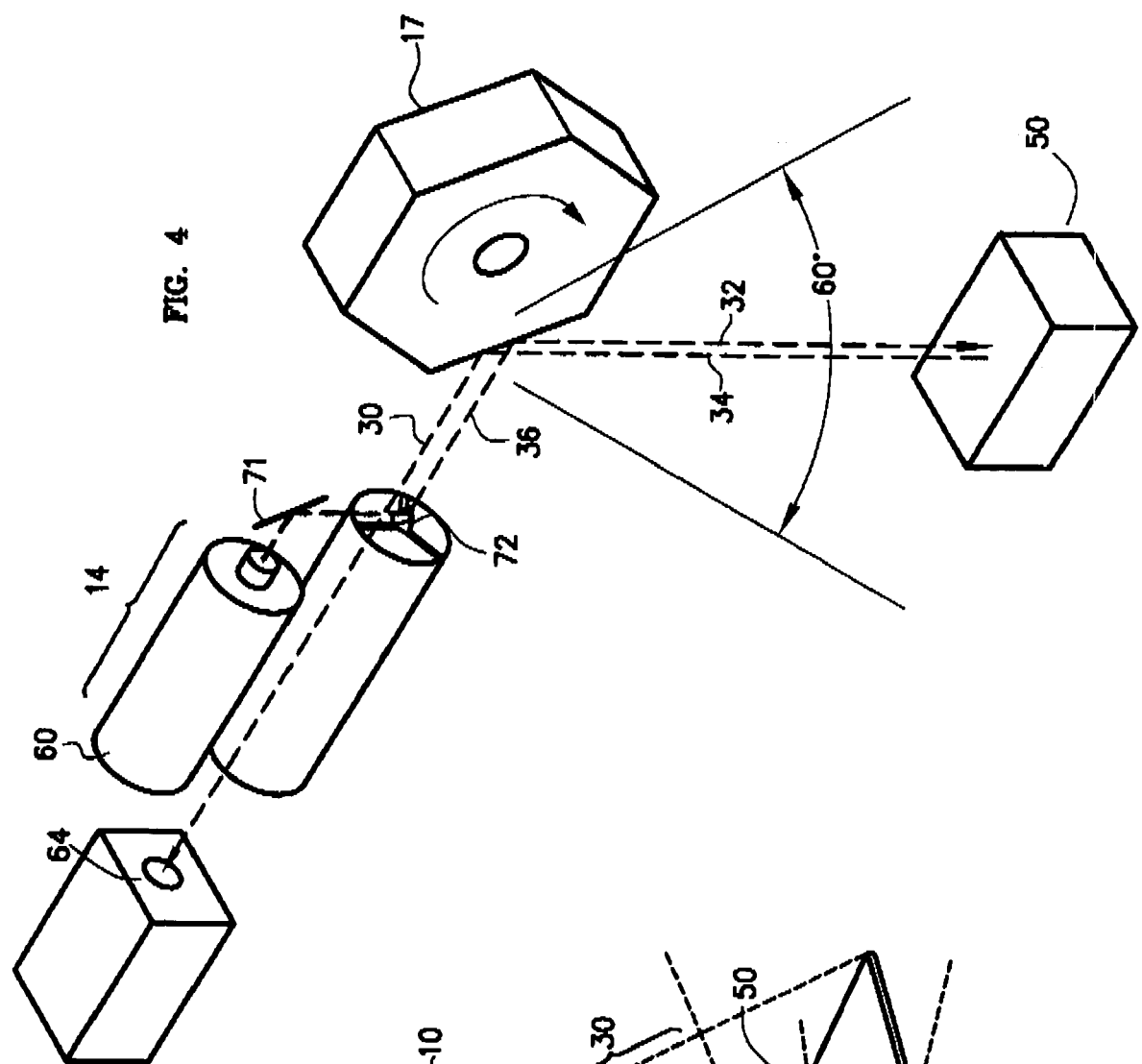
FIG. 4 is a conceptual diagram showing the laser and the avalanche photo detector used in conjunction with the hexagon shaped reflector having a scan width of 60 degrees.

The laser beam from the laser diode is applied to an optical scanning system 18 described in more detail with reference to FIG. 4, which scans an object 50 with the laser beam 30 modulated with a modulated signal which first travels from the laser to the rotating polygonal scanning mirror 17 and then this laser light 32 is directed from the rotating polygonal scanning mirror 17 and towards the surface area of object 50. A portion of the laser light 34 is reflected back from the surface area of the object and back to the rotating polygonal scanning mirror 17 entering through the holes in the spider complex 76. The reflected laser light 36 is then directed to the avalanche photo diode 16. Also shown in FIG. 4 is a pair of mirrors 71 and 73 which allow for the stacked arrangement of the laser 14 and photo diode 16, providing the correct alignment of laser light to the single rotating polygonal mirror 17. The optical scanning system also receives reflected modulated light from the surface area of the objects. Particularly, as the object is scanned, the reflected light from the scanned section is received and applied to the receiving portion (photo diode and associated computer connections) of the optical processing system. The avalanche photo diode 72 receive the reflected which is then electronically communicated using standard wire or wireless technology to a circuit or circuit board 64 that is specifically designed to process sinusoidal time and phase wave signals and converting the light energy in a digital format. An example of a avalanche photodiode 72 is manufactured by the Hamamatsu Photonics, a Japanase company with distribution sites throughout the world. The silicon avalanche photodiode (Si APD) has an internal gain mechanism, fast time response, low dark current and high sensitivity in the UV to near infrared region. Hamamatsu fabricates SI APDs with active areas ranging from 0.2 mm to 5.0 mm in diameter. The avalanche photodiodes are hermetically sealed in metal packages. The avalanche photodiodes are limited to gains below 200, they have excellent quantum efficiency in the near infrared and visible wavelengths. It is anticipated by the Applicants that several other currently manufactured or specifically designed avalanche photodiodes can be used with the present invention laser scanning apparatus. An example of a phase detector circuit board 64 that can be used with the present invention is AD8303 Evaluation Board manufactured by the company Analog Devices. It is anticipated by the Applicants that several other currently manufactured or specifically designed phase or time detection boards, can be used with the present invention laser scanning apparatus.

Figure 5:
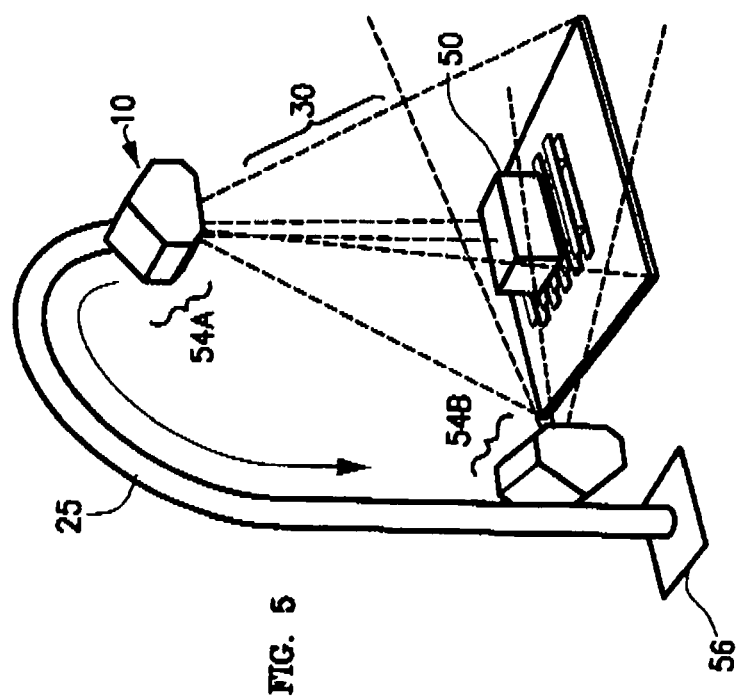
FIG. 5 is representation of the present invention single laser system mounted of a moveable arm system to accurately measure the physical dimensions of an object on a platform.

FIG. 5 is representation of the present invention single laser system mounted of a moveable arm system to accurately measure the physical dimensions of an object on a platform. In this embodiment, the present invention laser scanning apparatus 10 is suspended on a movable track from a suspended arm 25 mounted on a base 56. The present invention laser scanning apparatus 10 first completes a first scanning operation of the object 50 from a $1^{st}$ Scanning Position 54A and downloads this data to the computer database. The computer then determines that for better accuracy of measurements and volumetric calculations, the present invention laser scanning apparatus 10 is moved along the arm 25 to a $2^{nd}$ scanning position and then a second scanning operation is performed whereby the additional scanning data is downloaded to the computer database.

Figure 6:
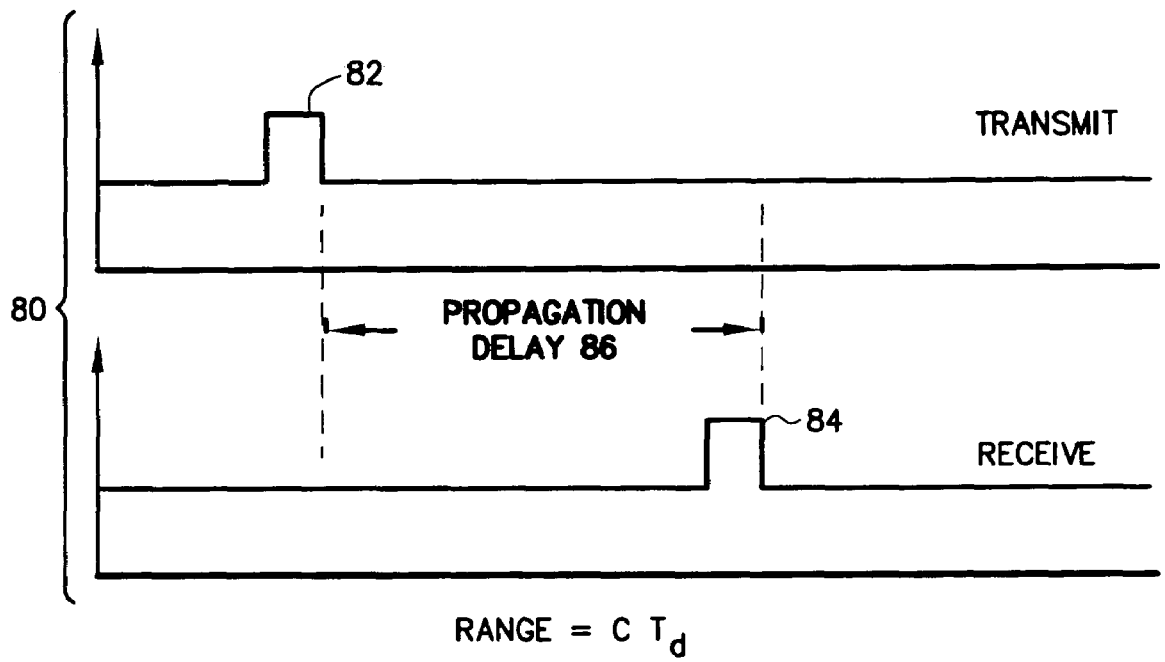
FIG. 6 is a graphical representation of the propagation delay between the time the laser signal is transmitted and the time the reflected laser signal is received.

FIG. 6 is a graphical representation of the propagation delay between the time the laser signal is transmitted and the time the reflected laser signal is received. As shown, a first signal is transmitted 82 which is subsequently received 84 by the optical system providing a propagation delay 86.

Figure 7:
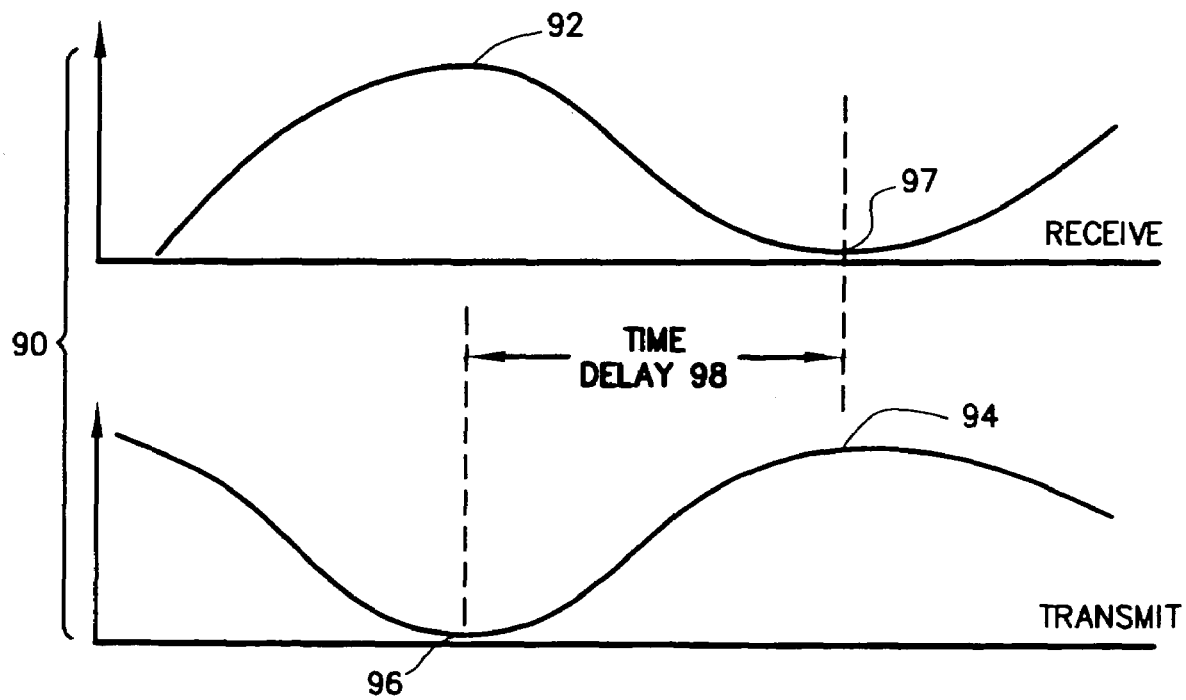
FIG. 7 is a graphical representation of the sinusoidal wave patterns of the modulated laser showing the time delay obtain from measuring the difference between a transmitted wave pattern and a received wave pattern.

FIG. 7 is a graphical representation of the sinusoidal wave patterns of the modulated laser showing the time delay obtain from measuring the difference between a transmitted wave pattern and a received wave pattern. As shown a first received peak wave 92 that corresponds to a maximum transmit dip 96.

Figure 8:
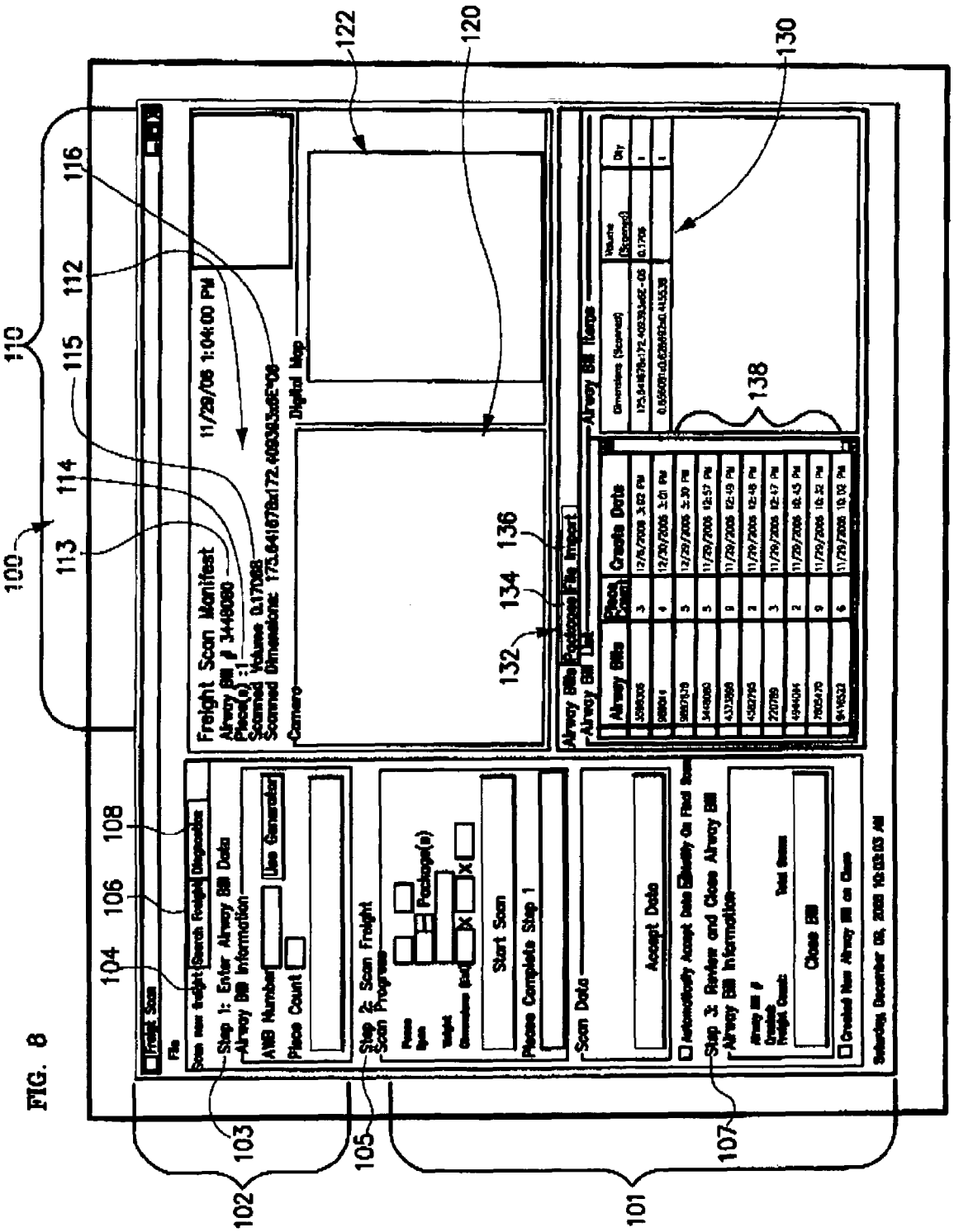
FIG. 8 is a pictorial representation of a typical computer display screen for the operator obtained when a object is scanned by the laser apparatus.

Once the volumetric information is procured from the scanning process, a unique computer with a novel software program is used to convey the volumetric information to the operator. Various displays are provided by the software program to determine how the information is used to determine the volumetric estimate of the object). Now referring to FIG. 8, a pictorial representation of a typical computer display screen 100 for the operator obtained when an object is scanned by the laser apparatus. As shown in the Figure, on the top right side 102 are soft buttons for performing various operations, such as scan new freight 104, search freight 106 or perform diagnostics and calibrations 108. Continuing along the right side 101 of this Figure shows a series of steps; 1) enter airway bill data 103, 2) scan freight 105 and 3) review and close airway bill 107. On the top center 110 of this example figure is a list of information concerning the current scanning operation 112 providing the operator with information such as the Airway Bill number 113, number of pieces scanned 114, scanned volume 115 and scanned dimensions 116. In this example the Airway Bill #3448080 is only a representation of the multitude of numbers that can be entered into the software program. The scanned volume of 0.17068 is in cubic feet and again is only a representation of the multitude volumes that will be obtained when the present invention laser system scans an object. Furthermore, the scanned dimensions of 175.64X times 167Y times 58Z is only a representation of the multitude of dimensions that will be obtained when the present invention laser system scans an object. Below this top center information and near the center of the screen are two pictures depicting the scanned object generated by the present invention. The left picture is a camera view 120 of the digital picture of the scanned object on the platform or skid 42 and reprinted on the computer display for the operator's review. The right picture 122 represents a digital map of the scanned object on the platform or skid and reprinted on the computer display for he operator's review. In the bottom center are soft buttons for performing various operations, display airway bills 132, package information 134 or file import 136. Below the soft buttons is a partial list of the air bill data 138 stored in a proprietary SQL database as part of the present invention. On the right bottom of the computer display is the current file of the SQL database providing another reprint of the scanned dimensions and calculated volume 130.

Calibration

At first use each time the present invention 10 is turned on and at specific intervals of operation, calibration of the system will be required. A calibration target (not shown) includes a plurality of steps whereby each step has a known position in three-dimensional space with respect to the scanning system 10. As each of the steps are scanned, the computer controller 27 calibrates the time or phase difference reading to the known for the specific distance of each calibration site. Thus, an exact measurement of the space difference corresponding to a known distance can be obtained. The calibration target may also comprise various shapes. For example, the calibration target can be round objects, trapezoid configurations, etc. It is also contemplated by the Applicants that the calibration target may be included with every object the is scanned, e.g. located near the edge of the platform or skid, thereby providing an accurate measurement of each scene as it changes.

Operation

During actual operations, the operator obtains one or more objects that are generally placed on pallets, skids or comparable transport surfaces constituting a relatively flat planar surface 42. For proper identification of the object 50, a bar code or RF tag is usually attached thereto wherein the bar code or RF tag is read by the operator with an appropriate reader. The object 50 is placed on the forklift and the bar code number or RF Tag information is input into the present invention computer program. The forklift can be outfitted with a head that when raising objects above the floor, a scale built into the forklift head, typically being a load cell unit weighs the object. The forklift operator then moves the forklift with the object to pass to the approximate center of the scanning laser platform or skid 42. After the object is placed within the platform or skid 42, the operator initiates the scanning operation by pushing a soft button on the computer display. Alternately, the initiation of scanning can be generated by the use of specifically placed sensors or by activating specific buttons on a wireless device. At this time, the Airway Bill Data included in the bar code, RF tag, or other identification information and the number of objects has been stored in the computer database. The laser scanning operation continues along the 60 degree angle in both the "X" and "Y" directions and each scan provides a series of data points that are stored in the computers database. When the scanning operation is complete, the operator reviews the volumetric calculations, the camera picture and digital map to confirm that accurate measurements have been performed. The image and data obtained during the particular scanning operation is recorded in a sequel Server data base that can reside in the computer or anyplace on the internet for access from the web. Alternately, in some of the other embodiments, the present invention laser scanning and recording apparatus 10 can determine that another scanning operation may be necessary to achieve the desired accuracy and if so designed, activate a movement along an arm to a second position for conducting a second scanning operation. In another embodiment, the use of mirrors along one or more sides of the platform or skid 42 can also provide additional data for the computer database in making volumetric calculations. Since the present invention laser scanning and recording apparatus 10 determines the height of each range measurement point and then the width and length of each of these points is also known. By taking the product of these three terms the volume is easily calculated. By computing each volume across the entire surface of the one or more objects constituting the parcel and then summing these volumes and then a total volume of the parcel can be determined.

The Operator then can close the airway bill and remove the object from the scanning area with the forklift and placed in a staging area. Then the operator can repeat the process and obtains another series of objects that are placed on pallets, skids or comparable transport surface constituting a flat planar surface and move these objects into the scanning area.

The invention claimed is:

1. A laser scanner apparatus for measuring two and three dimensional parameters of one or more objects on a platform, the apparatus comprising:
   a waveform generator to generate a predetermined reference waveform;
   an analog laser diode to supply a modulated laser beam responsive to the reference waveform;
   an optical scanning system for scanning a scene with a modulated laser beam and receiving a reflected modulated light from the objects on said platform, said optical scanning system having a hexagonal reflector connected to a series of computer control motors for moving said optical scanning system along a path, and said modulated laser beam being a result of the analog laser diode being driven by a signal modulated in the range of 20-30 megahertz;
   a plurality of mirrors positioned on sides of said platform to provide for reflection of the modulated laser beam against the objects in additional dimensions;
   a photo-detector positioned to receive said processed modulated light from the optical means, said photo-detector converting energy in said laser light into a time-modulated signal;
   a first electrical circuit for converting the time-modulated signal into a converted sinusoidal waveform that has zero crossing in said time-modulated range signal;
   a second electrical circuit for converting the reference waveform into a second converted sinusoidal waveform that has zero crossings in said reference waveform;
   a phase comparator coupled to receive said first and second converted waveforms and output a signal indicative of the time difference there between; and
   a processor means for displaying and recording physical measurements of objects in a specific location.

2. The laser scanner of claim 1 wherein said waveform generator comprises means for forming a sinusoidal waveform, so that said reference waveform has a sinusoidal shape and said intensity-modulated laser beam has a sinusoidally-varying intensity.

3. The laser scanner of claim 1 wherein said physical measurements provide a volumetric estimate of the object.

4. A laser scanner apparatus for measuring two and three dimensional parameters of one or more objects on a platform, the apparatus comprising:
   a waveform generator to generate a predetermined reference waveform;
   an analog laser diode to supply a modulated laser beam responsive to the reference waveform;
   an optical scanning system for scanning a scene with a modulated laser beam and receiving a reflected modulated light from the objects on said platform, said optical scanning system having a hexagonal reflector connected to a series of computer control motors for moving said optical scanning system along a path, and said modulated laser beam being a result of the analog laser diode being driven by a signal modulated in the range of 20-30 megahertz;
   a moveable arm system on which the optical scanning system is attached, the moveable arm system to allow the optical scanning system to move across multiple positions to scan the objects on the platform from those positions;
   a photo-detector positioned to receive said processed modulated light from the optical means, said photo-detector converting energy in said laser light into a phase-modulated signal;
   a first electrical circuit for converting the phase-modulated signal into a converted sinusoidal waveform that has zero crossing in said phase-modulated range signal;
   a second electrical circuit for converting the reference waveform into a second converted sinusoidal waveform that has zero crossings in said reference waveform;
   a phase comparator coupled to receive said first and second converted waveforms and output a signal indicative of the phase difference there between; and
   a processor means for displaying and recording physical measurements of objects in a specific location.

5. The laser scanner of claim 4 wherein said waveform generator comprises means for forming a sinusoidal waveform, so that said reference waveform has a sinusoidal shape and said intensity-modulated laser beam has a sinusoidally-varying intensity.

6. The laser scanner of claim 4 wherein said physical measurements provide a volumetric estimate of the object.

7. A laser scanner apparatus comprising:
   a waveform generator to generate a predetermined reference waveform;
   an analog laser diode to supply a modulated laser beam responsive to the reference waveform;
   an optical scanning system to scan a scene with a modulated laser beam and receive a reflected modulated light from objects on a platform, said optical scanning system having a hexagonal reflector connected to a series of computer control motors for moving said optical scanning system along a path, and said modulated laser beam being a result of the analog laser diode being driven by a signal modulated in the range of 20-30 megahertz;
   a moveable arm system on which the optical scanning system is attached, the moveable arm system to allow the optical scanning system to move across multiple positions to scan the objects on the platform from those positions;
   a photo-detector positioned to receive said processed modulated light from the optical means, said photo-detector to convert energy in said laser light into a time-modulated signal;

a first electrical circuit to convert the time-modulated signal into a converted sinusoidal waveform that has zero crossing in said time-modulated range signal;

a second electrical circuit to convert the reference waveform into a second converted sinusoidal waveform that has zero crossings in said reference waveform;

a phase comparator coupled to receive said first and second converted waveforms and output a signal indicative of the time difference there between; and a processor to display and record physical measurements of the objects on the platform.

* * * * *